UNITED STATES PATENT OFFICE.

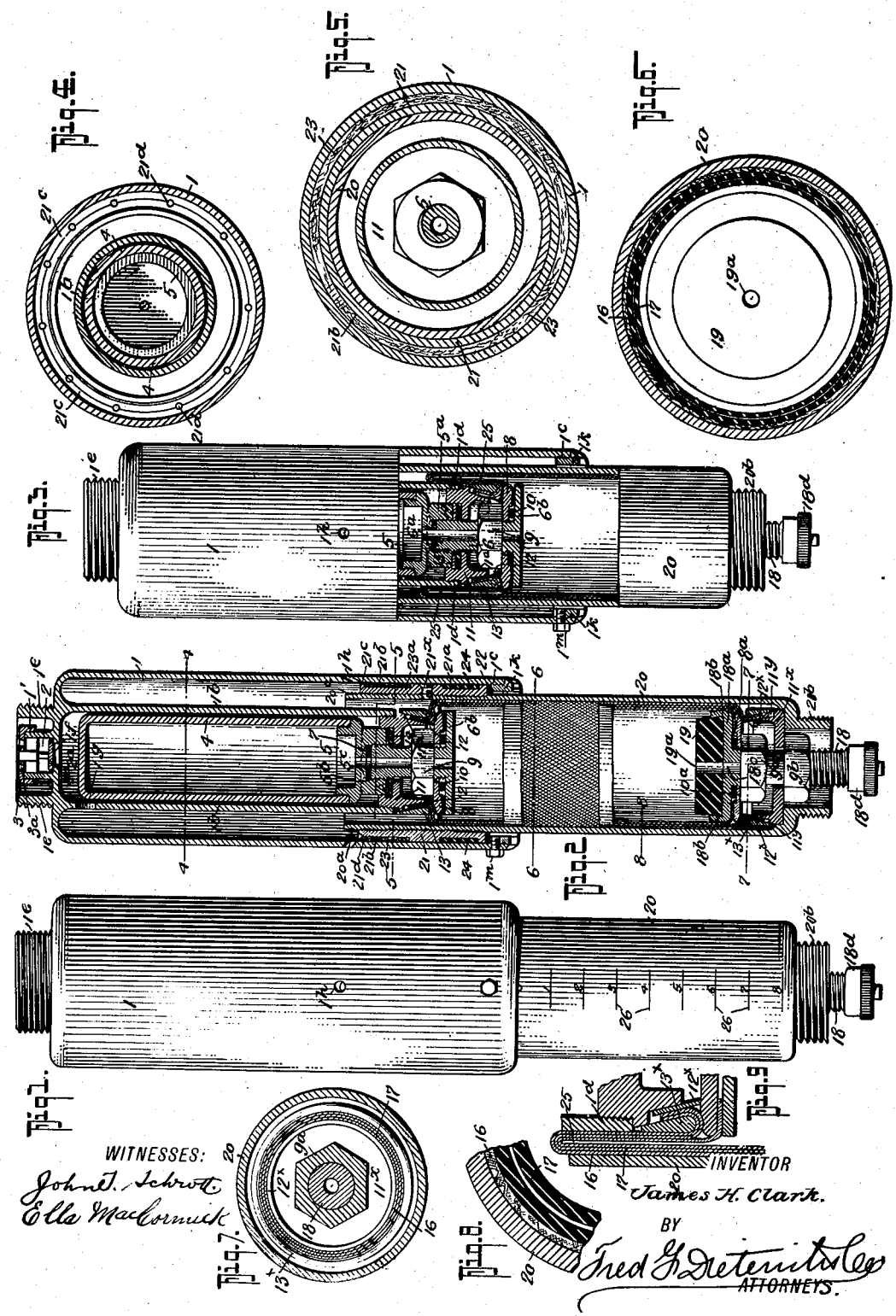

JAMES H. CLARK, OF RICHMOND, VIRGINIA, ASSIGNOR OF ONE-HALF TO FRANK M. THOMPSON, OF RICHMOND, VIRGINIA.

PNEUMATIC SUSPENSION MEANS.

No. 867,570.          Specification of Letters Patent.          Patented Oct. 8, 1907.

Application filed May 18, 1906. Serial No. 317,439.

*To all whom it may concern:*

Be it known that I, JAMES H. CLARK, residing at Richmond, in the county of Henrico and State of Virginia, have invented certain new and useful Improvements in Pneumatic Suspension Means, of which the following is a specification.

My invention relates to certain new and useful improvements in pneumatic suspension means more particularly adapted for use in supporting automobile bodies upon their running gear or for use on so called "springy" frame bicycles to take the place of the spring buffers now in common use.

Primarily, this invention has for its object to provide a suspension means of a very simple and effective construction which will readily and effectively serve its intended purposes and will serve to absorb all vibration and thus insure comfort to the occupant of the vehicle as well as enabling the use of solid and cushion tires on automobiles in place of the pneumatic tires now in common use.

Generically, my invention consists of telescoping cylinders, a piston, an auxiliary reservoir, means for obtaining lubrication, a vacuum valve, a valve for the admission of compressed air, and means whereby the desired pressure can be maintained without leakage. Air is admitted by a valve to said cylinder and reservoir and the pressure is maintained by a rubber tube connected to the end of the piston and extending through the length of the cylinder, being clamped at both ends. This tube on account of its internal pressure is supported by a casing composed of an expansible fabric lined on its inner surface with rubber to further protect the air tube.

In its more subordinate features the invention comprises certain novel construction, combination and arrangement of parts all of which will be first described in detail and then specifically pointed out in the appended claims, reference being had to the accompanying drawings, in which:—

Figure 1, is a side elevation of my invention. Fig. 2, is a vertical longitudinal section thereof, showing the position of the parts when no load is on them. Fig. 3, is a similar view showing the position of the parts when the cylinders are partly telescoped. Figs. 4, 5, 6 & 7, are respectively cross sections on the respective lines 4—4, 5—5, 6—6, and 7—7 of Fig. 2. Fig. 8, is an enlarged detail section on the line 8—8 of Fig. 2. Fig. 9, is an enlarged detail view of a part of my apparatus.

Referring now to the accompanying drawings in which like letters and numerals of reference indicate like parts in all of the figures, 1 designates the outer cylinder, with which the inner or piston cylinder $1^b$ is formed, the walls of the two cylinders being spaced a suitable distance apart to leave a chamber between them.

Within the chamber between the outer and inner cylinders, the intermediate telescoping cylinder 20 operates. The cylinder 20 has its open end externally screw threaded at $20^a$ to receive a collar or guide ring 21 which screws thereon and is held in place by a set screw $21^x$. The collar 21 has annular recesses $21^a$—$21^b$ to receive the packing ring 24 and the absorbent wick packing 23 respectively. The wick packing 23 serves to lubricate the inner wall of the chamber 1 and receives its oil supply through apertures $21^d$ communicating with an annular oil groove $21^c$ on the upper edge of the collar 21. The oil is fed to the groove $21^c$ when the parts are in the position shown in Figs. 1 and 2, through apertures $1^h$ in the cylinder 1. To prevent the cylinder 20 pulling out of the cylinder 1, the lower end of the cylinder 1 is threaded internally at $1^c$ to receive a check ring $1^k$ that is held from unscrewing by a set screw $1^m$. To serve as a buffer should the ring 21 engage the ring $1^k$, I provide a resilient washer 22 on the under edge of the ring 21.

The inner or piston cylinder $1^b$ near its top has an aperture $1^g$ communicating with the chamber between the inner and outer cylinders, and the tubes of the two cylinders merge into one. Centrally the cylinder top is apertured at $1^f$ and provided with a suitable means for attaching the cylinder to the vehicle such for instance, as the screw threaded collar $1^e$. The lower cylinder 20 has a similar screw threaded collar $20^b$ for similar purposes. The cylinder 1 has its end wall provided with an aperture $1^t$ and a valve housing $1'$ to receive the vacuum valve 2 that is provided with a small air aperture $2^a$. The valve housing $1'$ has a closure cap 3 to hold the valve 2 within the housing and the cap 3 is provided with air passages $3^a$, as shown. The lower end of the cylinder $1^b$ is internally screw threaded as at $1^d$ to receive the closure plug or head 11 which has an annular tapered rim $11^a$ to coöperate with the ring 12 and the wedge shaped ring 13 for a purpose presently to be made clear. The plug 11 has a central apertured web through which passes the stem 6. The stem 6 has a flat washer head $6^b$ and a central aperture $6^a$ and screws into a threaded socket $5^b$ in the closure plug 5 for the open end of an auxiliary reservoir 4 that is held within the inner or piston cylinder $1^b$ and out of contact with the walls thereof.

8 designates an annular metallic plate held on the stem 6 adjacent the head $6^b$, between which plate and head a rubber gasket 10 is held. The outer end of the inner rubber tube 17 is also held between the washer 8 and head 6ᵇ. The rubber tube 17 is secured in place by a check nut 9 on the stem 6 that holds the washer 8 down against the head 6ᵇ. The metallic washer 15 and resilient washer 14 are placed between the nut portion 5ᵃ of the plug 5 and the web of the plug 11 while a centrally apertured washer 7 is placed in the socket 5ᵇ between the end of the stem 6 and the socket wall. The plug 5 has an aperture 5ᶜ to coöperate with the aperture 6ᵃ of the stem 6. The outer tube 16 has its upper end secured between rings 12 and 13 which are wedged in place to tightly hold the tube 16 when the plug 5 is screwed onto the end of the stem 6. At the lower end, the cylinder 20 has a seat to receive the cup shaped centrally apertured screw member 11ˣ which has a beveled annular ring portion 11ʸ similar to that of the member 11. With this ring 11ʸ, rings 12ˣ and 13ˣ coöperate to hold the lower end of the outer tube 16 between them.

18 designates a valve stem within which the usual type of back check valve (not shown) as found on bicycle tire valves, is placed. The stem 18 has a central aperture 18ᶜ normally closed at the outer end by a screw cap 18ᵈ of the usual type. At its inner end the stem 18 has a flat head 18ᵃ formed with a recess 18ᵇ to receive a resilient bumper 19. The bumper 19 has an aperture 19ᵃ merging with the valve stem aperture. Between the head 18ᵃ and a metallic annular washer 8ᵃ is a rubber washer 10ᵃ and the lower edge of the inner tube 17 is also secured there between by a check nut 9ᵃ on the stem. A second nut 9ᵇ on the stem 18 serves to draw the member 11ˣ toward the head 18ᵃ and cause the rings 12ˣ and 13ˣ to tightly grip the tube 16.

In practice, I prefer to make the inner flexible tube 17 of rubber and of a diameter approximately that of the annular rim 11ʸ so it can be stretched over the heads 6ᵇ and 18ᵃ when put in position. Likewise I prefer to make the outer tube 16 of about the same diameter as the heads 6ᵇ and 18ᵃ. This outer tube 16, I also prefer to construct of flexible expansible fabric covered on its inner face with rubber so that its diameter can be expanded when air is forced into the inner tube 17, which forms the main air reservoir, and into the auxiliary reservoir 4. I also prefer to make the relative diameters of the inner cylinder 1ᵇ and the cylinder 20 such, that when the parts are in the position shown in Fig. 3, a slight clearance space 25, just sufficient to prevent rubbing of the adjacent surfaces of the rubber tube 17, is provided. On the outer surfaces of the cylinder 20, I place suitable graduations 26 to indicate the relative position of the telescoping cylinders. The inner cylinder 1ᵇ and its lower closure plug 11 form a piston as will be clearly understood from the drawings.

So far as described, the manner in which my invention operates, can be best explained as follows:—Assume the parts to be in the position shown in Figs. 1 and 2, the chamber within the inner tube 17 as well as the auxiliary reservoir 4 being filled with air under suitable compression. As soon as the apparatus is attached to the vehicle, the weight of the vehicle body (say, when attached to an automobile) will force the telescoping members into the position shown say in Fig. 3, the amount of air compression within the apparatus being arranged so that in the normal position of the parts, the sections will be telescoped, say until the graduation No. 3 is covered by the outer cylinder.

This will allow for any rebound and should an extraordinary vibration take place, that will throw the cylinders completely telescoped within one another the bumper 19 and the air cushion will take up the shock on the telescoping movement of the cylinders inward, and the partial vacuum produced in the chamber between the outer and inner cylinders 1—1ᵇ on the rebound will serve to compensate therefor. As the cylinders telescope inwardly, the air from the chamber between the cylinders 1—1ᵇ will pass through the aperture 1ᵉ in the inner wall 1ᵇ and out through the vacuum valve 2 as it leaves its seat. As the cylinders telescope outwardly from one another a partial vacuum will be produced between the cylinders 1—1ᵇ which gradually reduces to atmospheric pressure through the medium of the air that passes in through the small aperture 2ᵃ in the valve body, the diameter of the aperture, in practice, will be so constructed as to effect the desired results. By using the auxiliary reservoir a greater volume of air is obtained and hence the range of operation is greatly increased as the elasticity of the air column is also increased.

It will be noticed that the collar 21 is screwed down below the upper edge of the cylinder 20 to leave a projecting portion which forms a guard and prevents the oil when fed to the groove 21ᶜ through the aperture 1ʰ from running over and running down onto the fabric of the outer tube 16.

The graduations 26 on the cylinder 20 serve to indicate how much of the movement of the telescoping cylinders has been taken up by the load carried and such position can be easily varied by an increase or decrease of air pressure within the apparatus.

From the foregoing description, taken in connection with the accompanying drawings it is thought the complete construction, operation and numerous advantages of my invention will be readily understood by those skilled in the art to which it appertains and I desire it understood that many slight changes may be made without departing from the scope of the invention or that of the appended claims.

What I claim, is:—

1. In an apparatus of the class described, the combination with a pair of telescoping tubular members each closed at one end, of a flexible elastic tube connected to the open end of the inner telescopic member and the closed end of the outer telescoping member, and a flexible rubber lined fabric tube likewise connected to said telescoping members and surrounding the first mentioned flexible tube, and means for admitting compressed air into said first mentioned flexible tube, substantially as shown and described.

2. In an apparatus of the class described, the combination with a pair of telescoping tubular members each closed at one end, of a flexible elastic tube connected to the open end of the inner telescopic member and the closed end of the outer telescoping member, and a flexible rubber lined fabric tube likewise connected to said telescoping members and surrounding the first mentioned tube, means for admitting compressed air into said first mentioned flexible tube, and an auxiliary reservoir carried by one of said telescoping members and in communication with the interior of the first mentioned flexible tube.

3. An apparatus of the class described, comprising the combination with a pair of telescoping cylinders, a hollow cylindrical piston formed within one of said cylinders to project into the other telescopic cylinder, packing devices between the telescoping cylinders, a resilient air reservoir within one of said telescoping cylinders and having its ends connected with said cylinder and said piston, means for admitting compressed air into said resilient reservoir, and an auxiliary reservoir within said piston in communication with said resilient reservoir, substantially as shown and described.

4. An apparatus of the class described, comprising the combination with a pair of telescoping cylinders, a hollow cylindrical piston formed within one of said cylinders to project into the other telescopic cylinder, packing devices between the telescoping cylinders, a resilient air reservoir within one of said telescoping cylinders and having its ends connected with said cylinder and said piston, means for admitting compressed air into said resilient reservoir, said piston having an aperture in its wall and a vacuum valve mechanism secured to said piston carrying cylinder and in communication with the interior of the piston, substantially as shown and described.

5. In an apparatus of the class described, the combination with a pair of telescoping cylinders and means for forming an air cushion between them, of a ring carried by the inner telescoping cylinder, said ring having packing receiving grooves, a packing in one of said grooves and an absorbent wick in the other groove, said ring having an oil receiving groove in its upper edge and apertures communicating between the oil receiving groove and the absorbent wick packing grooves, oiling apertures within the outer cylindrical member, and a stop ring in the outer cylindrical member, substantially as shown and described.

6. In an apparatus of the class described, the combination with a pair of telescoping cylinders, means for forming an air cushion between them, of a ring carried by the inner telescoping cylinder, said ring having packing receiving grooves, a packing in one of said grooves and an absorbent wick in the other groove, said ring having an oil receiving groove in its outer edge and apertures communicating between the oil receiving groove and the absorbent wick packing groove, oiling apertures within the outer cylindrical member, a stop ring in the outer cylindrical member, and a resilient washer carried by the inner cylindrical member for coöperating with said stop ring, substantially as shown and described.

7. An apparatus of the class described, comprising a pair of upper and lower telescoping cylinders, a ring secured to the inner telescoping cylinder near its upper end, separate packing and lubricating devices carried by said ring for engaging the inner walls of the upper cylindrical member, a stop ring carried by the upper cylindrical member at its lower edge, a hollow cylindrical piston carried by the upper cylindrical member and projecting into the lower cylindrical member and spaced therefrom, an air retaining resilient tubular member secured at one end to said piston and at the other end to said lower telescoping member to form an air reservoir, means for admitting air into said reservoir, and an auxiliary reservoir within said hollow piston and communicating with said flexible reservoir, substantially as shown and described.

8. An apparatus of the class described, comprising a pair of upper and lower telescoping cylinders, a ring secured to the inner telescoping cylinder near its upper end, packing devices carried by said ring for engaging the inner walls of the upper cylindrical member, a stop ring carried by the upper cylindrical member at its lower edge, a hollow cylindrical piston carried by the upper cylindrical member and projecting into the lower cylindrical member and spaced therefrom, an air retaining resilient tubular member secured at one end to said piston and at the other end to said lower telescoping member to form an air reservoir, means for admitting air into said reservoir, said piston having an aperture in its wall communicating with the space between the piston and the piston carrying telescoping cylinder, and a vacuum valve communicating with the atmosphere and the interior of the piston, substantially as shown and described.

9. An apparatus of the class described, comprising an outer telescoping cylinder closed at one end, a hollow piston carried within said cylinder and in communication with the interior of the cylinder, a vacuum valve in said cylinder communicating with the atmosphere and the interior of the piston, a second telescoping cylinder telescoping within said first mentioned cylinder between the cylinder wall and the piston, a guide ring carried by the second telescoping cylinder, packing devices between the guide ring and the first mentioned telescoping cylinder, a flexible air tube connected at one end to said piston, and a valve connected to the other end of said flexible air tube and projecting through the outer end of the second telescoping cylinder, for admitting air into the air tube, substantially as shown and described.

10. An apparatus of the class described, comprising an outer telescoping cylinder closed at one end, a hollow piston carried within said cylinder and in communication with the interior of the cylinder, a vacuum valve in said cylinder communicating with the atmosphere and the interior of said piston, a second telescoping cylinder telescoping within said first mentioned cylinder between the cylinder wall and the piston, a guide ring carried by the second telescoping cylinder, packing devices between the guide ring and the first mentioned telescoping cylinder, a flexible air tube connected at one end to said piston, a valve connected to the other end of said flexible air tube and projecting through the outer end of the second telescoping cylinder, for admitting air into the air tube, and an auxiliary reservoir within said piston and communicating with said air tube, substantially as shown and described.

11. An apparatus of the class described, comprising an outer telescoping cylinder closed at one end, a hollow piston carried within said cylinder and in communication with the interior of the cylinder, a vacuum valve in said cylinder communicating with the atmosphere and the interior of the piston, a second telescoping cylinder telescoping within said first mentioned cylinder between the cylinder wall and the piston, a guide ring carried by the second telescoping cylinder, packing devices between the guide ring and the first mentioned telescopic cylinder, a flexible air tube connected at one end to said piston, and a valve connected to the other end of said flexible air tube and projecting through the outer end of the second telescoping cylinder, for admitting air into the air tube, said air tube comprising an inner rubber casing and an outer casing of expansible fabric substantially as shown and described.

12. An apparatus of the class described, comprising an outer telescoping cylinder closed at one end, a hollow piston carried within said cylinder and in communication with the interior of the cylinder, a vacuum valve in said cylinder communicating with the atmosphere and the interior of said piston, a second telescoping cylinder telescoping within said first mentioned cylinder between the cylinder wall and the piston, a guide ring carried by the second telescoping cylinder, packing devices between the guide ring and the first mentioned telescoping cylinder, a flexible air tube connected at one end to said piston a valve connected to the other end of said flexible air tube and projecting through the outer end of the second telescoping cylinder, for admitting air into the air tube, an auxiliary reservoir within said piston and communicating with said air tube, said air tube comprising an inner rubber casing and an outer casing of expansible fabric, substantially as shown and described.

13. The combination with a pair of telescoping cylinders closed at their outer ends, of a piston carried by one of said cylinders and projecting into the other cylinder, a rubber air tube connected to the end of said piston and projecting into the other cylinder, an air admitting valve mechanism secured to the other end of said air tube and projecting through the outer end of said other cylinder, and a resilient bumper carried by said valve mechanism for coöperating with said piston at times.

14. The combination with a pair of telescoping cylinders, of an inner flexible air tube within one of said cylinders, a piston carried by the other cylinder for projecting into the air tube carrying cylinder, a closure member for the end of said piston having an annular seat, a pair of annular rings held on said seat, an outer expansible tube surrounding said inner flexible tube and held with one end between said pair of rings, a headed stem passing through said piston end closure member, a washer on said stem, for securing one end of the inner tube between the washer and the stem, a nut on the stem for holding the washer in place, and means for drawing the stem against the piston end closure member to hold the end of the outer tubular member clamped, and a valve mechanism similarly connected to the other end of said flexible tubular members, substantially as shown and described.

15. The combination with an outer cylindrical member and an inner cylindrical piston carried by said outer cylindrical member and spaced from the inner walls thereof, said piston having an aperture communicating with the interior of the outer cylindrical member, a vacuum valve communicating with the atmosphere and the interior of the piston, a second telescoping member telescopically projected into the outer telescoping member between it and the piston and spaced from the walls of each, a ring carried by the second telescoping member, said ring having packing grooves, packing held in said grooves, means for admitting oil to one of said packing grooves, a stop ring carried by the first mentioned cylindrical member at its open end, an inner and outer flexible tube held within said second telescoping member, an inflating valve connected with said inner and outer flexible tubes at one end and projecting through the end of said second telescoping member, means for connecting the other end of said inner and outer tubes to said piston, all being arranged substantially as shown and described.

16. The combination with an outer cylindrical member and an inner cylindrical piston carried by said outer cylindrical member and spaced from the inner walls thereof, said piston having an aperture communicating with the interior of the outer cylindrical member, a vacuum valve communicating with the atmosphere and the interior of the piston, a second telescoping member telescopically projected into the outer telescoping member between it and the piston and spaced from the walls of each, a ring carried by the second telescoping member, said ring having packing grooves, packing held between said grooves, means for admitting oil to one of said packing grooves, a stop ring carried by the first mentioned cylindrical member at its open end, and inner and outer flexible tubes held within said second telescoping member, an inflating valve connected with said inner and outer flexible tubes at one end and projecting through the end of said second telescoping member, means for connecting the other end of said inner and outer tubes to said piston, and an auxiliary air reservoir held within said piston and communicating with said flexible tubes, substantially as shown and described.

17. The combination with an outer cylindrical member and an inner cylindrical piston carried by said outer cylindrical member and spaced from the inner walls thereof, said piston having an aperture communicating with the interior of the outer cylindrical member, a vacuum valve communicating with the atmosphere and the interior of the piston, a second telescoping member telescopically projected into the outer telescoping member between it and the piston and spaced from the walls of each, a ring carried by the second telescoping member, said ring having packing grooves, packing held in said grooves, means for admitting oil to one of said packing grooves, a stop ring carried by the first mentioned cylindrical member at its open end, and inner and outer tubes held within said second telescoping member, an inflating valve connected with said inner and outer flexible tubes at one end and projecting through the end of said second telescoping member, means for connecting the other end of said inner and outer tubes to said piston, an auxiliary air reservoir held within said piston and communicating with said flexible tubes, and graduations on the outer surfaces of said second telescoping member for coöperating with the first telescoping member to indicate the relative position of said telescoping members, substantially as shown and described.

18. The combination with an outer cylindrical member and an inner cylindrical piston carried by said outer cylindrical member and spaced from the inner walls thereof, said piston having an aperture communicating with the interior of the outer cylindrical member, a vacuum valve communicating with the atmosphere and the interior of the piston, a second telescoping member telescopically projected into the outer telescoping member between it and the piston and spaced from the walls of each, a ring carried by the second telescoping member, said ring having packing grooves, packing held between said grooves, means for admitting oil to one of said packing grooves, a stop ring carried by the first mentioned cylindrical member at its open end, and inner and outer flexible tubes held within said second telescoping member, an inflating valve connected with said inner and outer flexible tubes at one end and projecting through the end of said telescoping member, means for connecting the other end of said inner and outer tubes to said piston, an auxiliary air reservoir held within said piston and communicating with said flexible tubes, and a resilient bumper carried by said air admitting valve for coöperating with said piston at times.

JAMES H. CLARK.

Witnesses:
 CANNON H. FLEMING,
 WILLIAM WEBB.